US008868137B2

(12) United States Patent
Hicks, III

(10) Patent No.: US 8,868,137 B2
(45) Date of Patent: Oct. 21, 2014

(54) ALERT PROCESSING DEVICES AND SYSTEMS FOR NOISE-REDUCING HEADSETS AND METHODS FOR PROVIDING ALERTS TO USERS OF NOISE-REDUCING HEADSETS

(75) Inventor: John Alson Hicks, III, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1259 days.

(21) Appl. No.: 11/860,803

(22) Filed: Sep. 25, 2007

(65) Prior Publication Data

US 2009/0082071 A1    Mar. 26, 2009

(51) Int. Cl.
*H04M 1/00* (2006.01)
*H04M 19/04* (2006.01)
*G10K 11/178* (2006.01)
*H04M 1/60* (2006.01)

(52) U.S. Cl.
CPC .... *G10K 11/1788* (2013.01); *G10K 2210/1081* (2013.01); *H04M 19/04* (2013.01); *H04M 1/6066* (2013.01)
USPC ............... 455/569.1; 455/570; 455/575.2; 455/41.2; 455/567; 368/11; 368/12; 368/13; 381/71.6; 381/72; 381/74; 381/312; 381/23.1

(58) Field of Classification Search
CPC ...... H04R 1/00; H04R 1/1008; H04R 1/1016; H04R 1/105; H04R 1/1083
USPC ......... 455/570, 575.2, 567, 569.1; 381/55, 71
See application file for complete search history.

(56) References Cited

U.S. PATENT DOCUMENTS

| 5,654,690 A * | 8/1997 | Ishikawa et al. ............... 340/506 |
| 6,014,345 A * | 1/2000 | Schmadeka ..................... 368/10 |
| 6,035,047 A * | 3/2000 | Lewis .............................. 381/72 |
| 7,006,650 B1 * | 2/2006 | Wild ............................. 381/380 |
| 7,778,432 B2 * | 8/2010 | Larsen .......................... 381/315 |
| 2002/0141599 A1 * | 10/2002 | Trajkovic et al. ............ 381/71.6 |
| 2004/0179694 A1 * | 9/2004 | Alley .............................. 381/55 |
| 2006/0064533 A1 * | 3/2006 | Rael et al. ...................... 710/310 |
| 2007/0001806 A1 * | 1/2007 | Poll .............................. 340/7.59 |
| 2007/0184881 A1 * | 8/2007 | Wahl et al. ................. 455/575.2 |
| 2007/0298758 A1 * | 12/2007 | Verma et al. ............... 455/404.1 |
| 2008/0089530 A1 * | 4/2008 | Bostick et al. .................. 381/74 |

OTHER PUBLICATIONS iLuv™, Noise Canceling Headset with Bluetooth® Wireless Technology, Instruction Manual, i913, Dec. 7, 2006, 22 pages.

(Continued)

*Primary Examiner* — Dai A Phuong
(74) *Attorney, Agent, or Firm* — Myers Bigel Sibley & Sajovec, P.A.

(57) ABSTRACT

A system includes an active noise-reducing headset and an alert processor. The active noise reducing headset includes a communication module that establishes a wireless communication link, a microphone that generates a microphone signal in response to ambient noise, a speaker, a noise reduction circuit that generates a noise reduction signal in response to the microphone signal, and a control circuit that receives an incoming alert signal from the communication module and plays the alert signal over the speaker. The alert processor includes a second communication module that establishes the wireless link with the active noise-reducing headset, and a controller that receive an incoming alert signal, generates an alert notification in response to the alert signal, and transmits the alert notification to the active noise-reducing headset.

11 Claims, 4 Drawing Sheets

(56) References Cited

OTHER PUBLICATIONS

ZigBee™ Alliance, "Vision for the Home—Zigbee Wireless Home Automation" Brochure, Nov. 2006, 8 pages.

Kinney, Patrick, "ZigBee Technology: Wireless Control that Simply Works," Conference Paper, Communications Design Conference Oct. 2, 2003, 20 pages.

* cited by examiner

ALERT PROCESSING DEVICES AND SYSTEMS FOR NOISE-REDUCING HEADSETS AND METHODS FOR PROVIDING ALERTS TO USERS OF NOISE-REDUCING HEADSETS

FIELD OF THE INVENTION

This invention relates to noise-reducing headsets, and, more particularly, to systems, devices and methods for providing alert notifications to users of noise-reducing headsets.

BACKGROUND

Active noise-reducing headsets are used in many environments to reduce the level of background noise to which a user is subjected. For example, active noise-reducing headsets are commonly used in airplanes and other high ambient noise environments. Noise-reducing headsets are also used in home and office environments where a user desires more quiet. For example, a user may wish to listen to music or perform work without being bothered by background noise.

Active noise-reducing headphones take advantage of the ability of sound waves to interfere destructively with one another. Destructive interference occurs whenever a part of a sound wave that is in compression meets a part of another sound wave that is in rarefaction. The two sound waves tend to cancel each other out at that point, reducing the total amount of audio power at the point of cancellation. The maximum reduction in sound occurs when the peak of one sound wave (i.e. the point of greatest compression) meets the trough of another wave (i.e. the point of greatest rarefaction).

Active noise-reducing headsets use one or more microphones to detect ambient noise. The detected noise signal is phase shifted by 180° and played into the headphones as a noise-cancellation signal. The user hears both the ambient noise and the noise-cancellation signal. The ambient noise and the noise cancellation signal interfere destructively at the user's ear, which reduces the level of noise actually heard by the user of the headphones. Active noise-reducing headsets can include headphones that fit over and surround the ear, headphones that sit on the ear, and headphones that fit within the ear.

Some noise-reducing headsets can reduce background noise by as much as 50 dB. While more noise reduction is generally considered preferable, too much reduction in ambient noise can cause a user not to hear important audible information clearly, such as announcements, alarms, ring tones, and the like.

SUMMARY

An electronic device according to some embodiments of the invention includes a communication module configured to establish a communication link with an active noise-reducing headset, and a controller coupled to the communication module and configured to receive an incoming alert signal, to generate an alert notification in response to the alert signal, and to transmit the alert notification to the active noise-reducing headset via the communication link.

The communication link may include an RF and/or infrared short-range communication link. In some embodiments, the communication link may include a wireless LAN communication link, and establishing the communication link may include establishing a TCP-IP communication link between the communication module and the active noise-reducing headset.

The alert signal may include an electronic signal received from an alert generating device.

The electronic device may further include a microphone coupled to the controller and the alert signal may include an audible signal received via the microphone.

The controller may be configured to analyze the audible signal to determine a source of the audible signal, and to selectively retrieve a stored alert notification and/or generate the alert notification in response to determining the source of the audible signal.

The electronic device may further include a caller ID and/or voice over IP (VOIP) module coupled to the controller and configured to generate a caller identification in response to receiving an incoming call notification signal and to transmit the caller identification to the controller, and the controller may be further configured to selectively generate the alert notification in response to the caller identification.

The controller may be configured to determine a source of the alert signal, and to selectively generate the alert notification in response to determining the source of the alert signal. The device may further include a database that identifies actions to be taken in response to specified alert signals. The database may contain configuration information that specifies which of a plurality of headsets should receive notification of the specified alert signals.

The communication module may be further configured to receive a voice command from the active noise-reducing headset, and the controller may be further configured to take action in response to the voice command.

A system according to some embodiments of the invention includes an active noise-reducing headset and an alert processor. The active noise reducing headset includes a communication module configured to establish a wireless communication link, a microphone configured to generate a microphone signal in response to ambient noise, a speaker, a noise reduction circuit coupled to the microphone and the speaker and configured to generate a noise reduction signal in response to the microphone signal, and a control circuit configured to receive an incoming alert signal from the communication module and to play the alert signal over the speaker. The alert processor includes a second communication module configured to establish the wireless link with the first communication module of the active noise-reducing headset, and a controller coupled to the second communication module and configured to receive an incoming alert signal, to generate an alert notification in response to the alert signal, and to transmit the alert notification to the active noise-reducing headset via the communication link.

The system may further include a device configured to generate the alert signal.

The active noise-reducing headset may further include a voice over internet protocol (VoIP) module configured to establish a VoIP communication session with a remote terminal using an internet protocol. In some embodiments, the active noise-reducing headset may further include a voice recognition module configured to detect voice commands spoken by a user of the active noise-reducing headset and, in response to detecting the voice command, to send a signal indicative of the voice command to the control circuit.

Some embodiments of the invention provide methods including receiving an alert signal, generating an alert notification in response to the alert signal, establishing a communication link with an active noise-reducing headset, and transmitting the alert notification to the active noise-reducing headset via the communication link.

The communication link may include a wireless LAN communication link, and establishing the communication link may include establishing a TCP-IP communication link with the active noise-reducing headset.

The alert signal may include an electronic signal received from an external device.

The alert signal may be an audible signal received via a microphone. The methods may further include analyzing the audible signal to determine a source of the audible signal, and selectively generating the alert notification in response to determining the source of the audible signal.

The alert signal may include an incoming telephone call signal, and the methods may further include generating a caller identification in response to receiving the incoming telephone call signal, and selectively generating the alert notification in response to the caller identification.

The active noise-reducing headset may include one of a plurality of active noise-reducing headsets, the method may further include determining that the active noise-reducing headset should receive the alert notification, transmitting the alert notification to the active noise-reducing headset via the communication link may include selectively transmitting the alert notification to the active noise-reducing headset and not transmitting the alert notification to others of the plurality of active noise-reducing headsets.

The methods may further include receiving a voice command from the active noise-reducing headset, and taking action in response to the voice command.

It will be understood that while various embodiments of the invention have been described above, analogous system, method and computer program embodiments also may be provided according to other embodiments of the invention. Moreover, the various embodiments of the invention that are described herein may be combined in various combinations and subcombinations.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
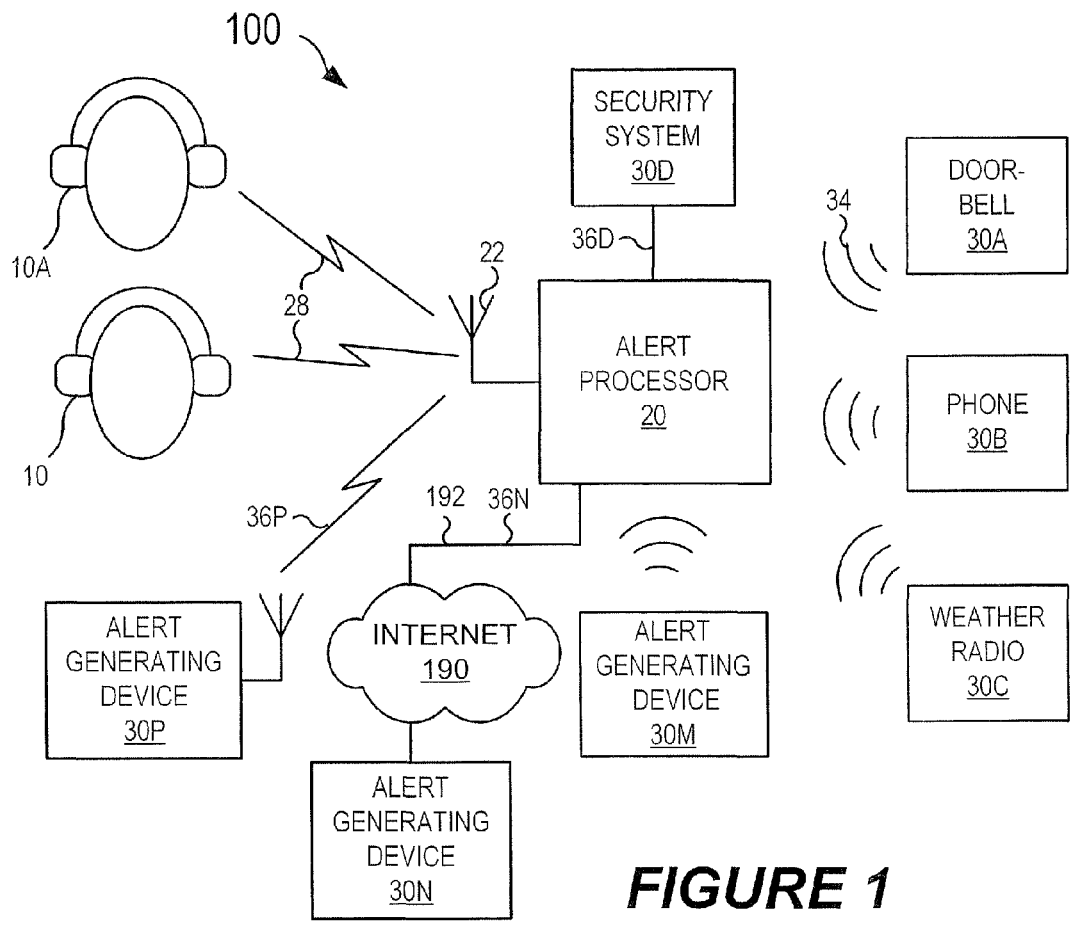
FIG. 1 is a block diagram of a noise reducing system according to some embodiments of the invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 is a block diagram of a noise reducing system 100 according to some embodiments of the invention. The noise reducing system 100 includes one or more noise-reducing headsets 10, 10A, and an alert processor 20. The noise-reducing headsets 10, 10A may be worn on a user's head as indicated schematically in FIG. 1. The noise-reducing headsets 10, 10A can include over-the-ear headphones, on-the-ear headphones, and/or in-the-ear headphones.

The alert processor 20 communicates wirelessly with the noise-reducing headsets 10, 10A. For example, the alert processor 20 can communicate wirelessly with the noise-reducing headsets 10, 10A via an RF communication link 28 using an antenna 22. Other means of wireless communication between the alert processor 20 and the noise-reducing headsets 10 can be employed, such as optical infrared (IR) and/or non-line-of-sight communications links. An optical non-line-of-sight communication link can be established, for example, using ultraviolet (UV) radiation.

The alert processor 20 communicates with a number of alert generating devices 30A-P that generate alerts, signals and/or alarms. The alert generating devices 30A-P can include, for example, devices such as a doorbell 30A, a telephone 30B, and a weather radio 30C that generate audible alerts 34. Other devices, such as smoke detectors, carbon monoxide detectors, motion detectors, etc, are depicted generally as alert generating device 30M, and can generate audible alerts 34 in systems/methods according to embodiments of the invention. In general, any device capable of generating an audible signal can be treated as an alert generating device in systems/methods according to embodiments of the invention.

Alert generating devices 30A-P can also include devices that do not generate an audible alert, but that provide an electrical alert signal to the alert processor 20 through other means. For example, alert generating devices can be connected directly to the alert processor 20 via a wired connection. As shown in FIG. 1, an electronic security/home automation system 30D can be connected to the alert processor 20, for example via a wireline connection 36D. An alert generating device 30N can be connected to the alert processor 20 through a data communication network 190, such as the Internet, via a wired or wireless connection 192.

As further illustrated in FIG. 1, an alert generating device 30P can be connected to the alert processor 20 via a wireless communication link 36P. The wireless communication link 36P can include, for example, a short range wireless connection, such as a Bluetooth connection and/or a wireless LAN connection.

Accordingly, the alert generating device 30P and the alert processor 20 can include, for example, corresponding infrared or ultraviolet communication modules, Bluetooth communication modules, and/or wireless local area network (WLAN) communication modules. With a Bluetooth module, the alert generating device 30P and the alert processor 20 can communicate with the alert processor via an ad-hoc wireless network. With a WLAN module, the alert generating device 30P and the alert processor 20 can communicate through a WLAN router (not shown) using a communication protocol that may include, but is not limited to, 802.11a, 802.11b, 802.11e, 802.11g, 802.11i, 802.11n, etc. Other communication interfaces, such as the 802.15.4 communication interface used for remote sensor communications, can be used.

The wireless communication link 36P can also include a long-distance wireless communication link, such as a cellular communication link. Thus, in some embodiments, the alert generating device 30P can include a cellular communication module. With a cellular communication module, the alert generating device 30P can communicate with the alert processor 20 through a base station using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The base station may be connected to a Mobile Telephone Switching Office (MTSO), which, in turn, may be connected to a telephone network, a computer data communication network (e.g. the internet), and/or another network to which the alert processor 20 is connected.

Alert generating devices, such as the alert generating devices 30N, 30P can, in some embodiments, be configured to detect audible alerts generated by the alert generating device 30M and to forward such alerts to the alert processor 20 via their respective communication links 36N, 36P. Thus, for example, an alert generating device 30P can act as a remote sensing device for the alert processor 20.

Accordingly, the alert generating devices 30A-P can communicate with the alert processor 20 through many different short-range and long-range electrical and/or audible communication mechanisms according to various embodiments.

The alert processor 20 is configured to receive alerts from one or more alert generating devices 30A-P. Upon receipt of an alert from an alert generating device 30A-P, the alert processor 20 generates an alert message and transmits the alert message to one or more of the noise-reducing headsets 10, 10A via the wireless communication link 28. Upon receipt of the alert message from the alert processor 20, the noise-reducing headset 10, 10A can play the alert message to the user over the headphone speakers. Thus, the user of the noise-reducing headset 10, 10A can hear and/or be notified of an alert that may otherwise be attenuated by the noise reduction circuits of the noise-reducing headset 10, 10A, and in some embodiments may be notified of alerts generated at remote locations.

According to some embodiments, the alert processor 20 may be configured to receive an audible alert, such as an alarm or ring from a doorbell 30A, and to re-transmit the audible alert to the noise-reducing headsets 10, 10A over the wireless communication link 28.

Furthermore, the alert processor 20 can determine if the particular alert should be re-transmitted to a user of a particular noise-reducing headset 10, 10A, and to re-transmit the alert to a particular noise-reducing headset 10, 10A only if it is determined that the particular noise-reducing headset 10, 10A should receive the alert. To accommodate this, the wireless communication interface used on the wireless communication link 28 can be configured to address individual noise-reducing headsets 10, 10A. The ability to individually address communication terminals is incorporated within short-range communication protocols, such as Bluetooth and 802.11-based protocols.

For example, in an exemplary system including the alert processor 20 and noise-reducing headsets 10 and 10A, the alert processor 20 may be configured to transmit alerts in response to a ring signal generated by the telephone 30B to the noise-reducing headset 10 but not to the noise-reducing headset 10A. When the alert processor 20 detects a ring from the telephone 30B, the alert processor 20 can re-transmit the ring from the telephone 30B to the noise-reducing headset 10 via the wireless communication link 28 but not to the noise-reducing headset 10A.

In further embodiments, the alert processor 20 is configured to analyze an incoming audible alert and determine the source and/or nature of the alert. The alert processor 20 can determine if a user of a particular noise-reducing headset 10, 10A should be notified of the alert. If so, the alert processor 20 can select or generate an alert message in response to the audible alert, and transmit the alert message to the appropriate noise-reducing headsets 10, 10A via the wireless communication link 28. Thus, various alert messages can be selectively provided to the noise-reducing headsets 10, 10A, depending on the nature of the alert and the configuration of the alert processor 20.

An alert other than an audible alert may be received and handled by the alert processor 20. For example, an electrical alert signal can be received from a device such as the electronic security/home automation system 30D, the alert generating device 30N, and/or the alert generating device 30P. When a non-audible alert is received by the alert processor 20, the alert processor 20 may be configured to generate/select an appropriate audible alert message, and to transmit the audible alert message to the noise-reducing headset 10, 10A via the wireless communication link 28.

For example, in an exemplary system including the alert processor 20 and noise-reducing headsets 10 and 10A, a water sensor can be provided as an alert generating device 30P. When the water sensor detects the presence of water, such as in a basement or crawl space of a house, the water sensor can send an electronic alarm signal to the alert processor 20 via the wireless communication link 36P. In response to the alarm signal, the alarm processor 20 can determine if any of the noise-reducing headsets 10, 10A in the system should receive alarm signals from the water sensor. If so, the alert processor 20 can select a pre-stored audible alarm message and/or generate an audible alarm message (e.g., "Alert—water detected at water sensor number 3") and transmit the audible alarm message to the appropriate noise-reducing headset 10, 10A.

Upon receipt of the alert message from the alert processor 20, the noise-reducing headset 10, 10A can play the alert message to the user via the headset's speakers.

Figure 2:
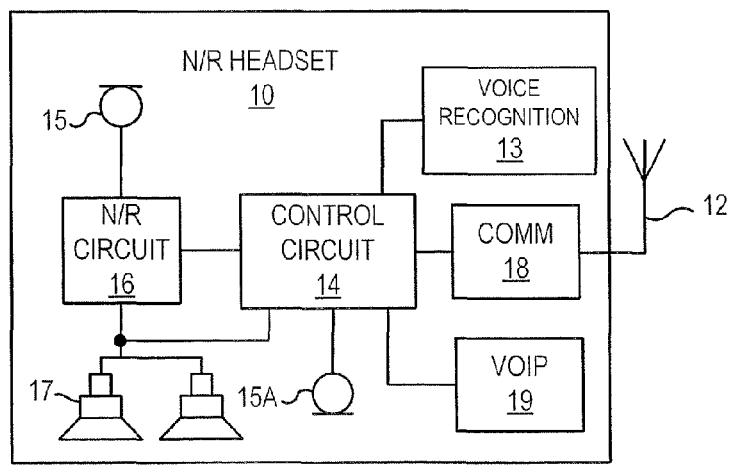
FIG. 2 is a block diagram of a noise-reducing headset according to some embodiments of the invention.

FIG. 2 is a block diagram of a noise-reducing headset 10 according to some embodiments of the invention. As illustrated in FIG. 2, a noise-reducing headset 10 can include a communications module 18 to which an antenna 12 is connected. The communications module 18 provides communication services for the noise-reducing headset 10. A control circuit 14 is coupled to the communications module and controls operations of the noise-reducing headset 10. The noise-reducing headset 10 further includes a microphone 15 configured to detect ambient noise, and a pair of stereo speakers 17, both of which are connected to a noise reducing circuit 16. As explained above, ambient noise detected by the microphone 15 is used by the noise reducing circuit 16 to generate a noise reducing signal that is played over the speakers 17 to the user, so that the level of ambient noise heard by the user is reduced.

In some embodiments, the communication module 18 can be configured to establish the communication link 28 with the alert processor 20, as shown in FIG. 1. The wireless communication link 28 can include, for example, a short range wireless connection, such as a Bluetooth connection and/or a wireless LAN connection. In particular, the wireless communication link 28 can permit the establishment of a TCP/IP connection between the noise-reducing headset 10 and the alert processor 20.

Accordingly, the communication module 18 can include, for example, an infrared or ultraviolet communication module, a Bluetooth communication module, and/or a wireless local area network (WLAN) communication module. With a Bluetooth module, the communication module 18 can communicate with the alert processor 20 via an ad-hoc wireless network. With a WLAN module, the communication module 18 can communicate through a WLAN router (not shown) using a communication protocol that may include, but is not limited to, 802.11a, 802.11b, 802.11e, 802.11g, 802.11i, 802.11n, etc. Other communication interfaces, such as the 802.15.4 communication interface used for remote sensor communications, can be used.

The noise-reducing headset 10 can also include an optional microphone 15A that is configured to detect words spoken by the user. The microphone 15A can be used to facilitate twoway voice communication with the alert processor 20, as well as to control the operation of the noise-reducing headset 10, as described in more detail below.

When an alert message is received by communication module 18 of the noise-reducing headset 10, the alert message is provided to the control circuit 14. The control circuit 16 plays the alert message over the speakers 17. In some embodiments, the control circuit 16 can cause the alert message to be added to the noise reducing signal that is played over the speakers 17 by the noise reducing circuit 16. In some embodiments, the control circuit 14 can play the alert message directly over the speakers 17.

In some embodiments, the noise reducing headphones can be configured to transmit a voice signal, such as a voice command spoken by a user of the noise-reducing headset 10 and picked up by the microphone 15A, back to the alert processor 20. Thus, for example, the user of the noise-reducing headset 10 can issue voice responses/commands back to the alert processor 20. The alert processor 20 can then act in response to the voice commands issued by the user of the noise-reducing headset 10 (e.g. to turn off an alarm, to send a notification to a third party, etc.).

Figure 3:
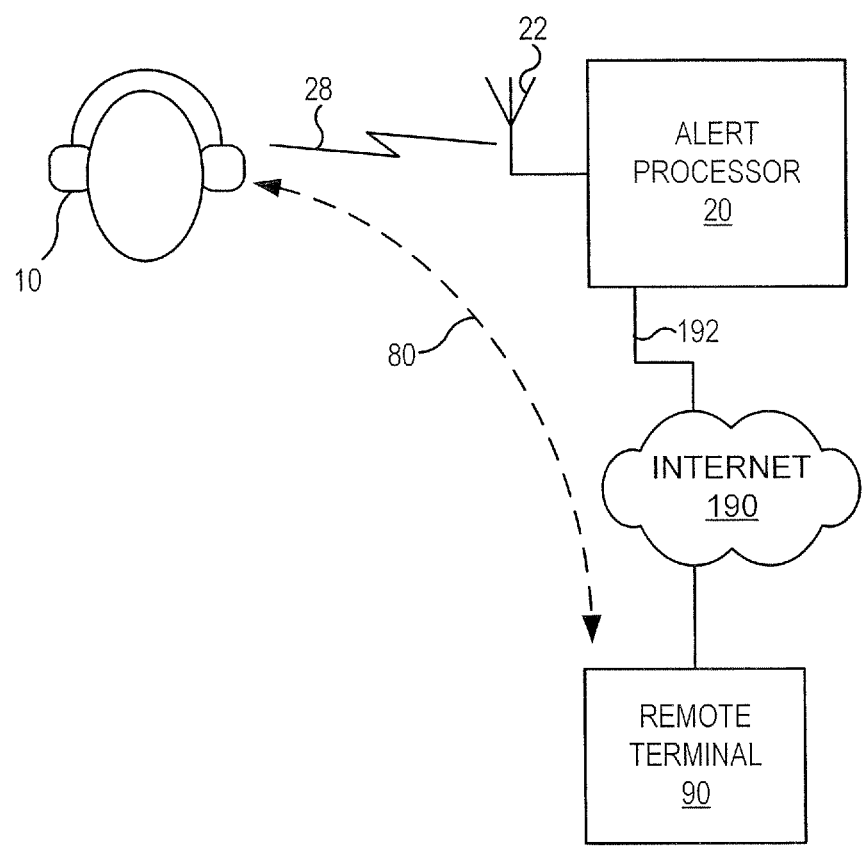
FIG. 3 is a block diagram illustrating further aspects of the noise reducing system of FIG. 1.

As further illustrated in FIG. 2, the noise-reducing headset 10 can include a voice recognition module 13 and a Voice Over IP (VoIP) module 19. The VoIP module 19 is configured to establish a VoIP telephone call between the noise-reducing headset 10 and a remote party using IP communication protocols. For example, as illustrated in FIG. 3, a TCP/IP communication link 80 can be established between the noise-reducing headset 10 and a remote terminal 90 on the internet 190 through the alert processor 20. This TCP/IP communication link 80 can be used to establish a VoIP session with the remote terminal 90.

The voice recognition module 13 is configured to receive and interpret voice signals, such as voice command spoken by a user of the noise-reducing headset 10 and picked up by the microphone 15A. In response to the voice commands, the voice recognition module 10 can cause the control circuit 14 to take a desired action. For example, a user of a noise-reducing headset 10 can answer an incoming VoIP that is received by the VoIP module 19 call by saying a voice command, such as "Answer Call". Similarly, the user of a noise-reducing headset 10 can place an outgoing VoIP call by saying a voice command, such as "Place Call", and then saying a voice command, such as "Call John", to place an outgoing VoIP call. Upon detection of a spoken command, the voice recognition module 13 notifies the control circuit 14, which causes the VoIP module 19 to initiate/answer the call.

Voice recognition can also be used to control various operational aspects of the noise-reducing headset 10, such as instructing the headset to adjust its sensitivity to various types of alerts. For example, the user could cause the noise-reducing headset 10 to play or not to play alerts for incoming telephone calls by speaking an appropriate voice command (e.g. "Call alerts on" or "Call alerts off").

Figure 4:
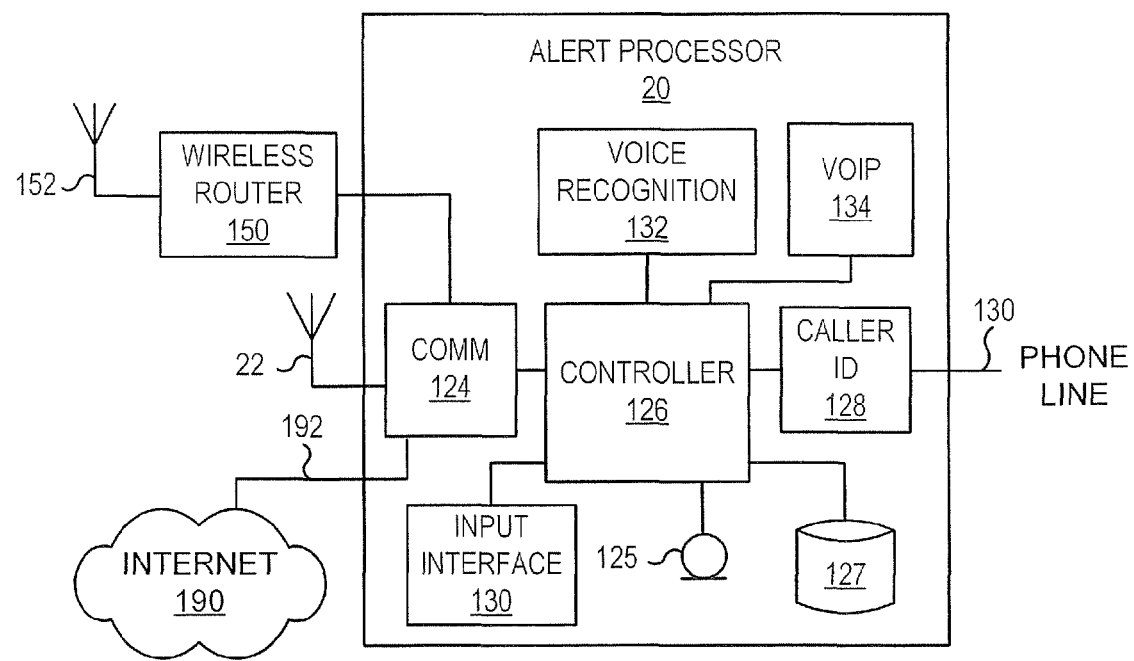
FIG. 4 is a block diagram of an alert processor according to some embodiments of the invention.

An alert processor 20 according to embodiments of the invention is illustrated in further detail in FIG. 4. As shown therein, the alert processor 20 can include a controller 126, and a communication module 124 that is configured to communicate with noise-reducing headsets 10, 10A and/or alert generating devices 30A-P over a wireless link using an antenna 22. The communication module 124 can also be configured to communicate over a wired or wireless communication link 192 through the Internet 190. Thus, for example, the communication module 124 can be used to establish a TCP/IP connection with a remote terminal. The communication module can also be configured to establish wireless communication links with noise-reducing headsets 10 and/or alert generating devices 30A-P over a wireless router 150, which includes an antenna 152.

In some embodiments, the communication module 124 can be configured to establish the communication link 36P with an alert generating device 30P, as shown in FIG. 1. As noted above, the wireless communication link 36P can include, for example, a short range wireless connection, such as a Bluetooth connection and/or a wireless LAN connection.

Accordingly, the communication module 124 can include, for example, an infrared or ultraviolet communication module, a Bluetooth communication module, and/or a wireless local area network (WLAN) communication module. With a Bluetooth module, the communication module 124 can communicate with the alert processor via an ad-hoc wireless network. With a WLAN module, the communication module 124 can communicate through a WLAN router (not shown) using a communication protocol that may include, but is not limited to, 802.11a, 802.11b, 802.11e, 802.11g, 802.11i, 802.11n, etc. Other communication interfaces, such as the 802.15.4 communication interface used for remote sensor communications, can be used.

The alert processor 20 further includes a microphone 125 that is configured to detect audible alert signals 34 from devices, such as a doorbell 30A (FIG. 1), etc. The alert processor 120 can include an optional caller ID module 128 that is coupled to a phone line 130. When a telephone call is received on the telephone line 130, the caller ID module 128 can determine an identity of the calling party and generate an appropriate alert message to be provided to a noise-reducing headset 10 in response to the call. For example, the alert processor 20 can be configured to notify a user of a noise-reducing headset 10 of all incoming calls, or only of incoming calls that originate from particular calling parties identified by the caller ID module 128. Incoming telephone calls received as voice-over-IP (VOIP) calls can also be detected using a VOIP module 134 that communicates with the internet 190 using the communication module 124.

The alert processor 20 can receive non-audible alerts, such as alerts from an electronic security/home automation system 30D (FIG. 1), through an input interface 130, which can include a wired input port.

The alert processor 20 can also include a voice recognition module 132 that can be used to interpret voice commands received by the alert processor from the user of a noise-reducing headset 10 with which the alert processor 20 is communicating. For example, after transmitting an alert message to a noise-reducing headset 10, the user of the noise-reducing headset 10 can speak a voice command that is received by a microphone 15A (FIG. 2) in the noise-reducing headset 10 and transmitted back to the alert processor 20. The voice command can be a command instructing the alert processor to, for example, cause the alert generating device 30A-P that initially generated the alarm to take an action, such as turning off the alarm. The voice command could include any other command, such as a command to cause the alert processor to forward the alert message to another noise-reducing headset 10, or to a remote terminal using a TCP/IP or other communication protocol.

The alert processor 20 further includes a database 127 in which information, such as configuration information, alert messages, and other information can be stored. For example, the alert processor 20 can store configuration information, such as the information shown in Table 1—Alert Configuration Table.

TABLE 1

Alert Configuration Table

| Headset ID | Alert Generating Device 30A | Alert Generating Device 30B | Alert Generating Device 30C | Alert Generating Device 30D |
|---|---|---|---|---|
| 0001 | Xmit message Message ID = 'xFD34' | Transmit Alert | Ignore | Generate Message |
| 0002 | Xmit message Message ID = 'xFD34' | Transmit Alert | Ignore | Ignore |
| 0003 | Ignore | Ignore | Xmit message Message ID = 'x28A9' | Ignore |

For example, as shown in Table 1, a system according to embodiments of the invention includes three headsets 10, each of which has a unique headset identification number 0001 to 0003. The system also includes four alert generating devices 30A-30D. The Alert Configuration Table shown in Table 1 indicates how the alert processor should handle an alert received from any of the alert generating devices 30A-30D. For example, upon receipt of an alert from the alert generating device 30A, the alert processor 20 will retrieve a stored message having a message ID of 'xFD34' and transmit the message to the headsets having headset ID numbers 0001 and 0002. The alert message is not transmitted to the headset having headset ID number 0003.

Upon receipt of an alert from the alert generating device 30B, the alert processor 20 will re-transmit the alert to the headsets having headset ID numbers 0001 and 0002, but not to the headset having headset ID number 0003.

Upon receipt of an alert from the alert generating device 30C, the alert processor 20 will retrieve a stored message having a message ID of 'x28A9' and transmit the message to the headset having headset ID number 0003.

Upon receipt of an alert from the alert generating device 30D, the alert processor 20 will generate an alert message and transmit the alert message to the headset having headset ID number 0001. For example, the alert generating device 30D can include the telephone line 130 (FIG. 4), and the alert can include an incoming ring signal with caller identification information. In response to the incoming call, the alert processor 20 can generate a synthesized voice message (e.g., "Incoming call received from telephone number 555-2345"), and transmit the generated message to the appropriate headset.

Accordingly, the alert processor can consult the configuration information stored in the database 127 to determine how to handle various types of alerts.

Figure 5:
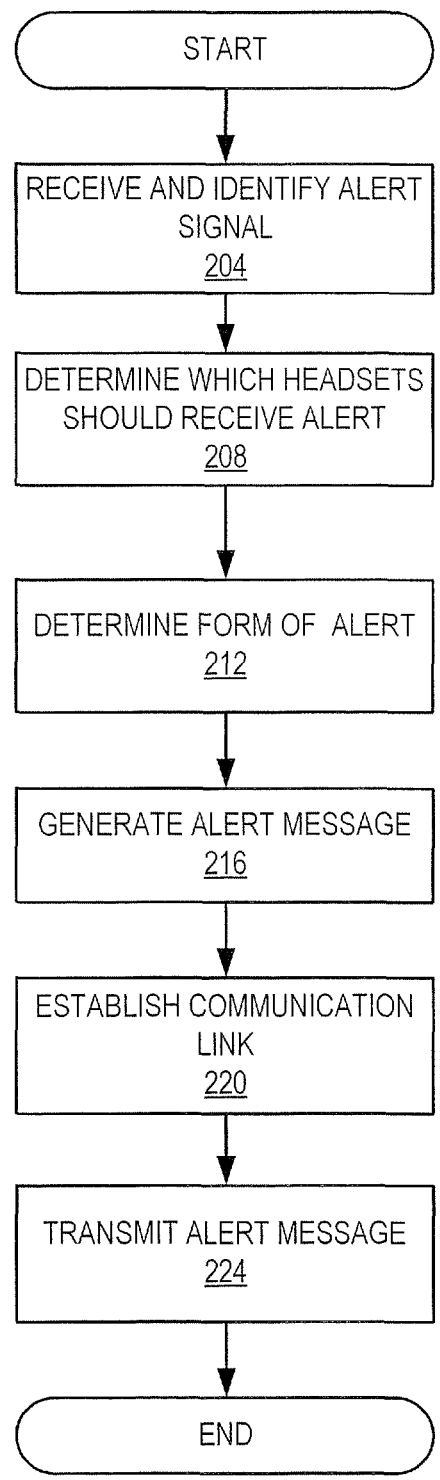
FIG. 5 is a flowchart illustrating systems/methods according to embodiments of the invention.

Systems/methods according to embodiments of the invention are illustrated in the flowchart of FIG. 5. Referring to FIGS. 1-5, an alert signal is received and identified at an alert processor 20 (Block 204). The alert signal can take many forms. For example, the alert signal can include an audible signal generated by an alert generating device such as a doorbell, telephone, or other device. The alert signal can also include an incoming ring signal on a telephone line and/or an electrical signal received by the alert processor 20 using an input interface 130 and/or a digital signal received using a communication module 124.

The incoming alert signal is analyzed by the alert processor 20 to determine the source of the alert signal.

The alert processor 20 then determines which noise-reducing headsets 10 that are registered to the alert processor 20 should receive a notification of the incoming alert signal (Block 208). In some embodiments, the alert processor 20 can check a list of registered noise-reducing headsets 10 to see which noise-reducing headsets 10 are active. The alert processor 20 can then determine if any of the active noise-reducing headsets 10 should be notified of the incoming alert using configuration information stored in the database 127 in the alert processor 20.

Assuming that a noise-reducing headset 10 exists that should receive notification of the alert, the alert processor 20 can then determine, based on stored configuration information, what form of alert message should be provided to the noise-reducing headset 10 (Block 212). For example, for some types of alerts, the alert signal received by the alert processor 20 is simply re-transmitted to the appropriate noise-reducing headset(s) 10. In some cases, however, the alert processor 20 can retrieve a stored alert message, or generate an appropriate alert message (Block 216).

The alert processor 20 then establishes a communication link 28 (Block 220) and transmits the received alert signal or the retrieved or generated alert message to the appropriate noise-reducing headset(s) 10 (Block 224).

Systems/methods according to embodiments of the invention can be particularly useful in settings such as in commercial airliners, where passengers can be provided with noise-reducing headsets. It can be important for all passengers to hear announcements by the captain and crew of the airplane. Systems/methods such as those described above can help to ensure that passengers using noise-reducing headsets do not miss important announcements.

Furthermore, systems and/or methods according to some embodiments of the invention can provide individualized announcements and/or alert messages to particular users, which may be useful in a corporate or commercial setting.

Systems/methods according to embodiments of the invention can also be useful in home settings. In particular, some users wear noise-reducing headsets to sleep. In such cases, systems/methods according to embodiments of the invention can help ensure that users do not miss critical alert messages, such as fire/smoke/carbon monoxide alarms, while not awakening the user for non-critical alerts, telephone calls, etc. Moreover, systems/methods according to embodiments of the invention can permit a user to use a noise-reducing headset in a location that is far removed from the alarm-generating device. For example, a user may have a water detector in his or her basement. While the detector alarm signal may be loud in the basement, it may not be as audible in other parts of the house, and could potentially be attenuated by the noise-reducing headset. Using systems/methods according to the present invention, the user could wear a noise-reducing headset in any location around the house in which a communication link could be established between the alert processor and the noise reducing headset and still be confident of being notified of an alert signal generated by the water detector.

Furthermore, systems/methods according to embodiments of the invention can be particularly useful/helpful for persons with hearing disabilities that prevent them from hearing selected frequencies, such as high frequencies, that can be used in audible alarms. For example, the functionality described herein can be incorporated into the design of a hearing aid, notifying a hearing-impaired user of both auditory and non-auditory alerts.

In some embodiments, a noise-reducing headset can be designed for comfortable wearing during sleeping. The noise-reducing function can help a user deal with a snoring spouse/partner, while ensuring that the user is notified of any alerts that occur while he or she is sleeping.

Many other uses and applications will be readily apparent in view of the teaching of the present invention, and the invention is not limited to a particular configuration of devices, or type of devices.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An electronic device, comprising:
a communication module to establish a wireless communication link with an active noise-reducing headset that is located remotely from the electronic device; and
a controller coupled to the communication module to receive an incoming audible alert signal that was audibly transmitted by an alert generation device, to analyze the audible alert signal to determine if it should be re-transmitted to the active noise-reducing headset, and to re-transmit the audible alert signal to the active noise-reducing headset via the wireless communication link in response to the analysis of the audible alert signal;
wherein the controller is to determine a source of the audible alert signal, and wherein the controller is to selectively transmit the audible alert signal in response to determining a source of the audible alert signal, the device further comprising a database that identifies actions to be taken in response to specified alert signals, wherein the database contains configuration information that specifies which of a plurality of headsets should receive notification of the specified alert signals.

2. The electronic device of claim 1, wherein the wireless communication link comprises an RF communication link.

3. The electronic device of claim 1, wherein the wireless communication link comprises a wireless local area network communication link, and wherein establishing the wireless communication link comprises establishing a transmission control protocol-internet protocol communication link between the communication module and the active noise-reducing headset.

4. The electronic device of claim 1, wherein the communication module is further to receive a voice command from the active noise-reducing headset, and wherein the controller is further to take action in response to the voice command.

5. A system comprising:
an active noise-reducing headset comprising:
a communication module to establish a wireless communication link;
a microphone to generate a microphone signal in response to ambient noise;
a speaker;
a noise reduction circuit coupled to the microphone and the speaker and to generate a noise reduction signal in response to the microphone signal; and
a control circuit to receive an incoming alert signal from the communication module and to play the alert signal over the speaker; and
an alert processor that is remote from the active noise-reducing headset, the alert processor comprising:
a second communication module to establish the wireless link with the first communication module of the active noise-reducing headset; and
a controller coupled to the second communication module and to receive an incoming audible alert signal that was audibly transmitted by an alert generation device, to analyze the audible alert signal to determine if it should be re-transmitted to the active noise-reducing headset, and to re-transmit the audible alert signal to the active noise-reducing headset via the communication link;
wherein the controller is to determine a source of the audible alert signal, and wherein the controller is to selectively transmit the audible alert signal in response to determining a source of the audible alert signal, the device further comprising a database that identifies actions to be taken in response to specified alert signals, wherein the database contains configuration information that specifies which of a plurality of headsets should receive notification of the specified alert signals.

6. The system of claim 5, further comprising:
the alert generation device to generate the audible alert signal.

7. The system of claim 5, wherein the active noise-reducing headset further comprises a voice over internet protocol module to establish a communication session with a remote terminal using an internet protocol.

8. The system of claim 5, wherein the active noise-reducing headset further comprises a voice recognition module to detect voice commands spoken by a user of the active noise-reducing headset and, in response to detecting the voice command, to send a signal indicative of the voice command to the control circuit.

9. A method, comprising:
receiving an audible electronic alert signal that was generated by an alert generation device;
analyzing the audible alert signal to determine if it should be transmitted to an active noise-reducing headset;
establishing a communication link with an active noise-reducing headset; and
re-transmitting the audible alert signal to the active noise-reducing headset via the communication link;
wherein the active noise-reducing headset is one of a plurality of active noise-reducing headsets, the method further comprising:
determining that the active noise-reducing headset should receive the alert signal;
wherein transmitting the alert signal to the active noise-reducing headset via the communication link comprises selectively transmitting the alert signal to the active noise-reducing headset and not transmitting the alert signal to others of the plurality of active noise-reducing headsets.

10. The method of claim 9, wherein the communication link comprises a wireless local area network communication link, and wherein establishing the communication link comprises establishing a transmission control protocol-internet protocol communication link with the active noise-reducing headset.

11. The method of claim 9, further comprising:
receiving a voice command from the active noise-reducing headset, and taking action in response to the voice command.

* * * * *